United States Patent [19]
Ebert

[11] 3,935,756
[45] Feb. 3, 1976

[54] METHOD FOR MANUFACTURING A FILE FROM A THIN-WALLED TUBE

[75] Inventor: Ernst Udo Ebert, Wexford, Ireland

[73] Assignee: Firma August Ruggeberg, Marienheide, Germany

[22] Filed: Jan. 15, 1975

[21] Appl. No.: 541,101

[30] Foreign Application Priority Data
Jan. 15, 1974 Germany............................ 2401671

[52] U.S. Cl.................................. 76/24 R; 72/370
[51] Int. Cl.² ......................................... B24B 73/06
[58] Field of Search ......... 76/24 R, 101 R, 101 SM; 72/370

[56] References Cited
UNITED STATES PATENTS

| 265,975 | 10/1882 | Nicholson | 76/24 R X |
| 1,985,158 | 12/1934 | Furler | 76/24 R |

FOREIGN PATENTS OR APPLICATIONS

| 473,998 | 3/1929 | Germany | 76/24 R |

Primary Examiner—Al Lawrence Smith
Assistant Examiner—Nicholas P. Godici
Attorney, Agent, or Firm—Browdy and Neimark

[57] ABSTRACT

A file of non-circular cross section is formed from a multiple helical pattern of teeth and then reshaping the tube internally using a shaping mandrel.

6 Claims, 8 Drawing Figures

METHOD FOR MANUFACTURING A FILE FROM A THIN-WALLED TUBE

FIELD OF THE INVENTION

The invention relates to files, and, more particularly, to a method for manufacturing a file with filing or rasping teeth and with a non-circular cross-sectional shape from a thin-walled tube.

BACKGROUND OF THE INVENTION

In a similar method, known from German Pat. No. 661,901, a cylindrical, blank, seamless tube made of soft iron is cut to the appropriate length and brought to the desired cross-sectional shape by means of a hammer forge. Then this hollow body is stamped in a press with appropriate forging dies, simultaneously using a shaping mandrel, so that the hollow body, in an annealing, pressing and drifting installation, can then be brought to maximum accuracy as regards size, shape, smooth surfaces and edges.

In order to produce sharp lengthwise edges, the hollow bodies are rolled to the desired edge sharpness using an appropriate mandrel and applying fluted and curved, interchangeable profile mill cutters. After the tube has been shaped to the desired cross-sectional profile, the surface of this hollow body is given its file cut, then casehardened in a pack hardening, casehardening or nitriding process, so that the file teeth, made of soft iron, will acquire the necessary hardness.

On the one hand, this method is very costly; on the other hand, carbonized file steel is not the same as conventional file steel.

It is known from German Pat. No. 473,998 to make files from tubes, with the teeth being produced by drawing the tube through a matrix. Since the teeth run parallel to the axial direction of the tube after drawing, the tube is rotated in the warm state in order to bring the lengthwise-running teeth into the correct cutting position. Then the tube is cut in half lengthwise, and each half of the tube is bent flat again. The purpose of this method is to avoid the conventional tooth-cutting methods such as cutting or grinding and to use a simpler method of making the teeth, namely drawing.

SUMMARY OF THE INVENTION

Contrary to the prior art, an object of the present invention is to provide a method of the type described initially hereinabove in which files can be produced whose geometry corresponds to that of conventional files, in a simple fashion using proven file tool steels and proven tooth-cutting methods; it is another object to overcome the defects of the prior art, such as indicated above; and it is another object to provide for improved and inexpensive files.

These objects are accomplished in accordance with the present invention by providing a tube, composed of file material, in the unformed state continuously with a multiple helical pattern of teeth, after which the tube receives its noncircular cross-sectional shape by virtue of shaping forces acting exclusively on its inside walls.

This method according to the invention ensures that the tool steels usually employed and proven in the manufacture of files with solid cross sections can be used. In particular, this refers to unalloyed tool steels with a carbon content of 1.2 to 1.3% and alloyed tool steels with a carbon content of 1.0 to 1.4% and a chrome content of 0.7 to 1.5%.

One especially significant advantage consists in the fact that the teeth can be produced in one continuous process, especially the so-called helical cutting method, on a tube with a circular original cross section. It is therefore not necessary for the teeth to be produced only after the tube has been shaped to the desired form for the body of the file, e.g. triangular, square, taper square, half round, or the like, thereby undesirably requiring that the teeth be applied individually to each of these surfaces. In other words, the teeth on all the surfaces of the finished file can be produced in one continuous work process. The method of shaping excludes the file teeth from being damaged during shaping. The finished files require only a simple known casehardening process involving heating and tempering. Files manufactured using the method according to the invention, in addition to these advantages involving manufacturing techniques, have another advantage, namely, fully formed file teeth are located on all edges, thus resulting in a considerable increase in cutting ability in the edge areas.

Advantageously, during the shaping of the tube, its outside diameter remains essentially unchanged and as a result the individual file teeth remain practically unaltered in their geometry during the shaping process; of course, it must be pointed out that slight deformations are unavoidable, but are likewise insignificant. In an especially simple embodiment of the method, the deforming forces are produced by pressing a mandrel, with a cross section to the cross-sectional shape of the file, into the tube. Deforming forces shall be understood to be only the normal forces acting upon the mandrel or the tube, while the slight forces which result in the axial direction of the tube due to the friction between the mandrel and the tube cause no deformation in the lengthwise direction and are therefore negligible. According to a further advatangeous feature of the invention, the tube is supported on its inside wall during the production of the teeth, in order to prevent deformation of the tube, especially during the production of teeth using the helical cutting technique, during production of the teeth.

BRIEF DESCRIPTION OF THE DRAWING

Further advantages and features of the invention can be seen from the description of a sample embodiment with reference to the drawing, wherein.

DETAILED DESCRIPTION

Figure 1:
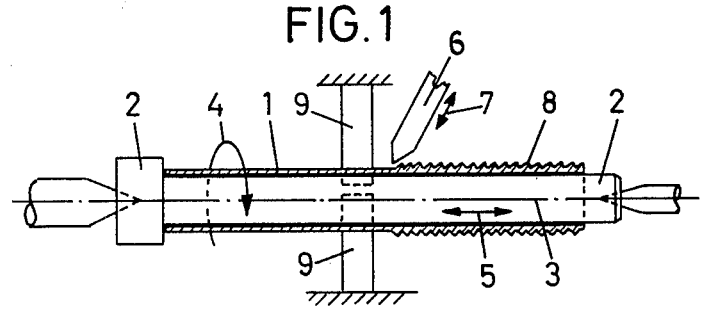
FIG. 1 schematically shows a device for manufacturing teeth on a tube.

As can be seen from FIG. 1, a thin-walled tube 1 made of tool steel which is usually employed for files, having a wall thickness of for example 1 mm, is pushed onto a supporting rod 2 which fills completely the inside cross section of the tube, and is held to this supporting rod by a suitable force-locking device. The support rod itself can be driven around its central lengthwise axis 3 in the direction of the arrow 4, the axis 3 coinciding with the central axis of the tube 1. In addition, the support rod 2 together with the tube 1, can be displaced in two directions along its central lengthwise axis 3, according to directional arrow 5.

By means of a cutting bit 6, very rapid oscillating strokes are delivered very rapidly in the direction of arrow 7 with simultaneous rotation in the direction of arrow 4 and axial displacement according to directional arrow 5, to produce a helical tooth pattern 8 continuously on the outside of tube 1. This method for producing teeth is termed the helical cutting technique. In the vicinity of the point of application of the cutting bit 6 on the tube 1, the latter is held in a fixed position by a supporting clamp 9, so that elastic deformation of the tube is prevented. This type of manufacture of teeth is known for solid file bodies.

Figure 2:
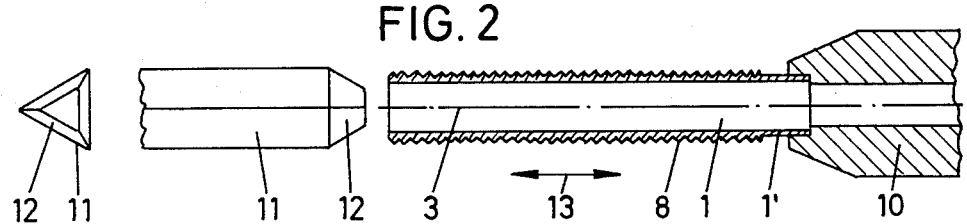
FIG. 2 schematically shows the shaping of a tube provided with file teeth to give the tube a non-circular cross section.

As can be seen from FIG. 2, an end segment 1' of the tube 1 is not provided with teeth 8. After the teeth have been produced, the toothed tube 8 together with its non-toothed segment 1' is gripped by a suitable holder, such as pincers 10. Then tube 1, beginning at its other end remote from the pincers 10, is pressed onto a coaxially mounted shaping mandrel 11 and shaped to fit the cross section of the mandrel. The mandrel has a tapered segment 12 at the end which first enters tube 1, then maximum diameter of said tapered segment 12 at its free, blunt end in any case being less than the diameter of the tube, so that trouble-free penetration of the mandrel 11 into the tube 1 is ensured. The shaping mandrel 11, aside from tapered segment 12, has a constant cross section, with its outside circumference in this area being approximately equal to the inside circumference of the unshaped tube 1. After the shaping of tube 1 in its tooth area by passage thereinto of the mandrel 11, with the toothless area 1' remaining unshaped, tube 1 is pulled off the mandrel in the direction of arrow 13. Of course, the pincers may be mounted in a fixed manner and the shaping mandrel may be movable. The drive of the pincers 10 or the shaping mandrel can be effected advantageously by means of a hydraulic actuating cylinder, not shown.

Figure 3A:
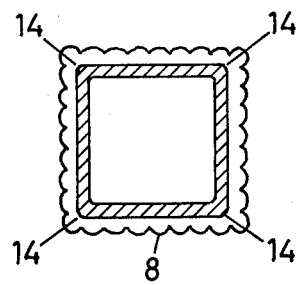
FIGS. 3a and 3b show a square file manufactured using the method according to the invention, as compared to a conventional square file, both in cross section.
Figure 3B:
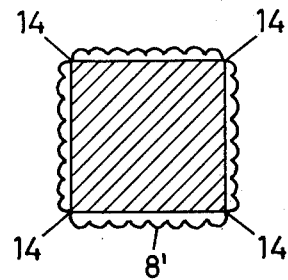

While the shaping mandrel 11 shown in FIG. 2 has a cross section which is an equilateral triangle and therefore produces a triangular file, in FIG. 3a a file is shown in cross section, produced using a shaping mandrel with a square cross section. As can be seen from this drawing, this file has teeth 8 which extend from one surface of the file to the next, even on lengthwise edges 14, while the prior art file shown in FIG. 3b for comparison, with a solid cross section, has its teeth 8' interrupted along the lenghtwise edges 14. This is due to the fact that in these conventional files the individual surfaces and edges are provided with teeth separately, and therefore uncontrolled tooth formations occur on the transitions.

Figure 4A:
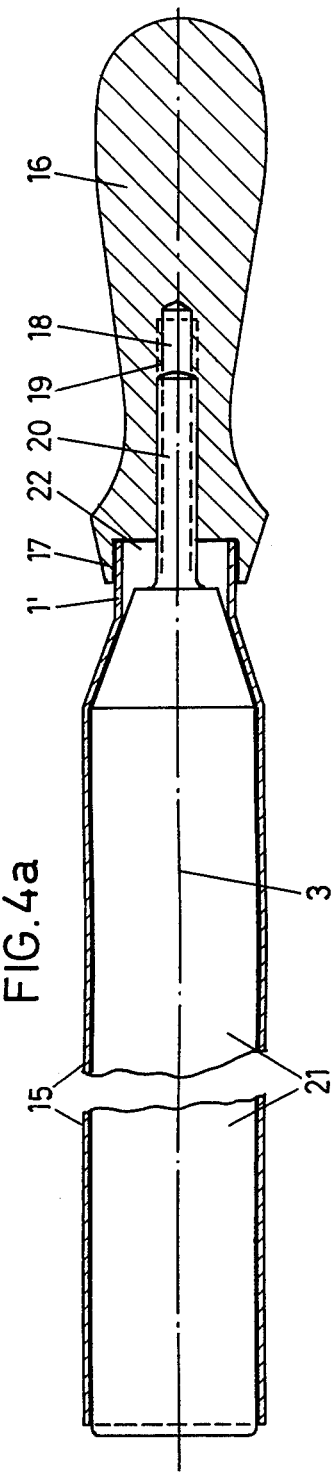
FIGS. 4a, 4b and 4c show a file manufactured using the method according to the invention, in a lengthwise top view, a lengthwise side view, and an end view.
Figure 4B:
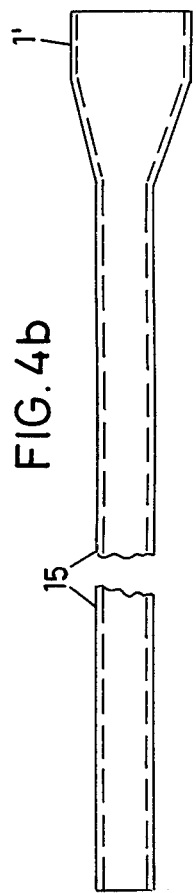
Figure 4C:
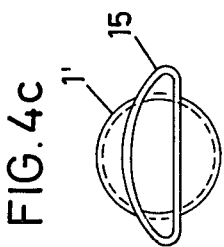

The file 15 shown in FIGS. 4a to 4c, in the shaped area provided with teeth, has a cross section in the shape of a segment of a circle (see FIG. 4c). Its unshaped segment 1' is inserted in a handle 16 located coaxially with respect to its central lengthwise axis 3, the handle 16 having a collar 17 which surrounds and centers segment 1'. Handle 16 has a bore 18 located coaxially with respect to the central lengthwise axis 3, and this bore 18 may be provided with a thread 19. A threaded bolt 20, to which file 15 is fastened, can be screwed into this thread 19. If the handle 16 is made of plastic or wood or the like, the thread 19 can also be dispensed with, since the bolt 20 itself then cuts a thread in bore 18.

The threaded bolt 20, in the embodiment according to FIG. 4a, is fastened to a holding or supporting element 21, whose shape corresponds to the inside shape of file 15 and therefore, due to the noncircular cross-sectional shape of the file, is protected against rotation relative to the file. By screwing handle 16 onto the threaded bolt 20, the tubular segment 1' of file 15 is pulled and tensioned in the recess 22 in the handle 15 delimited by the collar 17.

Figure 5:
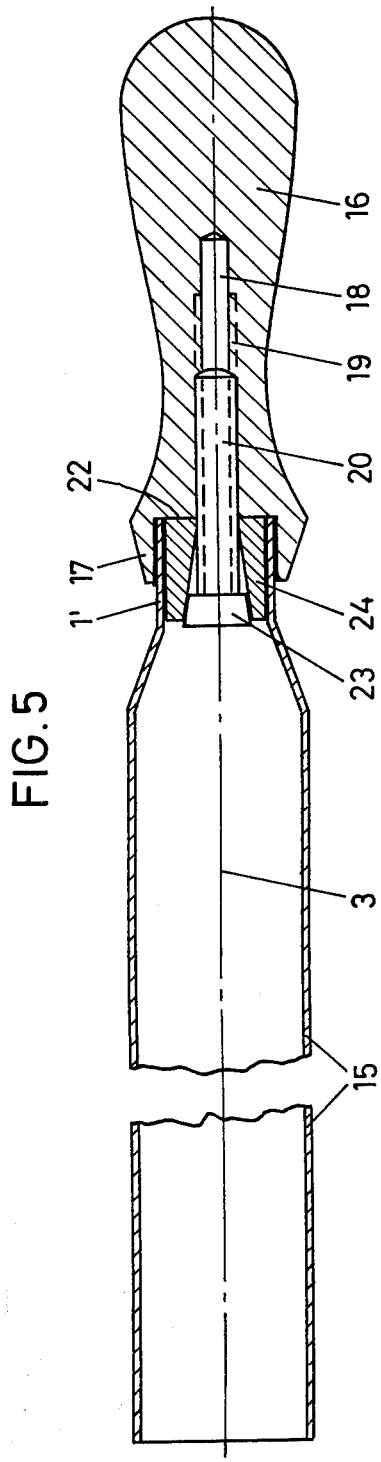
FIG. 5 shows another file according to the invention, with a different method for attaching a file handle.

In the embodiment according to FIG. 5, threaded bolt 20 is provided at the end facing file 15 with a tensioning nut 23, wider at the outside, by means of which a shim 24, located in the tubular segment 1' of the file 15, is expanded as the bolt 20 is scrwed into the bore 18, thus producing a firm force-locking connection between the tubular segment 1', the tensioning bolt 23 and the handle 16.

It will be obvious to those skilled in the art that various changes may be made without departing from the scope of the invention and the invention is not to be considered limited to which is shown in the drawings and described in the specification.

What is claimed is:

1. A method for manufacturing a file with filing or rasping teeth from a hollow thin-walled tube composed of tool steel, said file having a noncircular cross-sectional profile, comprising:
   forming multiple, helical file teeth on the surface of the unshaped thin-walled tube; and
   shaping the toothed tube into a noncircular cross-sectioned profile by applying shaping forces exclusively on the inside wall of the tube.

2. Method according to claim 1, wherein the outside circumference of the tube remains essentially unchanged during the shaping.

3. Method according to claim 1, wherein the shaping step comprises pressing a mandrel whose cross-sectional profile corresponds to the desired cross section of the finished file into the tube.

4. Method according to claim 3, further including the step of supporting the tube on the inside wall thereof during said cutting step.

5. Method according to claim 3, wherein said cutting and shaping steps leave an end segment of the tube unshaped, and not provided with teeth.

6. A hollow thin walled file produced in accordance with the process of claim 1.

* * * * *

UNITED STATES PATENT AND TRADEMARK OFFICE
CERTIFICATE OF CORRECTION

PATENT NO. : 3,935,756
DATED : February 3, 1976
INVENTOR(S) : Ernst Udo EBERT

It is certified that error appears in the above—identified patent and that said Letters Patent are hereby corrected as shown below:

The correct name of the assignee is:

FIRMA AUGUST RÜGGEBERG

Signed and Sealed this

Thirteenth Day of July 1976

[SEAL]

Attest:

RUTH C. MASON
Attesting Officer

C. MARSHALL DANN
Commissioner of Patents and Trademarks